United States Patent Office 2,828,337
Patented Mar. 25, 1958

2,828,337
METHOD OF OXIDIZING ALDEHYDES

Arthur C. Whitaker, Pittsburgh, Pa., assignor to Gulf Research & Development Company, Pittsburgh, Pa., a corporation of Delaware No Drawing. Application January 17, 1956
Serial No. 559,526

10 Claims. (Cl. 260—530)

This invention relates to a process for preparing acids from aldehydes and particularly a process for preparing organic acids from aliphatic aldehydes.

From an economic viewpoint two factors are of utmost importance in producing acids by the oxidation of aldehydes. Two competing reactions are involved in such conversion: decarbonylation of aldehydes to produce hydrocarbons and aldolization of the aldehydes. Since acids are much more valuable than hydrocarbons, it is obvious that the process should be conducted in such manner as to inhibit the formation of hydrocarbons and aldolization of the aldehydes and increase the production of acids. The second factor involves reaction time. The reaction producing acids from aldehydes by oxidation is of appreciable duration, and accordingly a reduction in reaction time would be exceedingly attractive in commercial practice.

I have found that the oxidation of aliphatic aldehydes can be accelerated and a high yield of acid can be obtained by subjecting an aldehyde to the action of a gas containing molecular oxygen in the presence of an oxidation catalyst and a salt of a strong base and a weak acid at a moderate temperature.

It is possible to oxidize aldehydes with a gas containing molecular oxygen without the presence of an oxidation catalyst or modifier and yet obtain a product containing a high ratio of acid to hydrocarbon. This is shown in Example I below.

EXAMPLE I

One mole of isomeric aldehydes having 8 carbon atoms, obtained in the Oxo process by the hydroformylation of carbon monoxide, hydrogen and heptenes at a temperature of 350° F. and a pressure of 3500 pounds per square inch in the presence of cobalt carbonyl as catalyst, was placed in a glass reactor equipped with a fritted disc disperser and outlet. The reactor was placed in a thermostatted oil bath at 50° to 55° C., and air was passed through the liquid at a rate of 1.8 cubic feet per hour for a period of 5.5 hours. The product was distilled and the data showed that conversion of the aldehyde was 96.2 mole percent, giving 12.1 mole percent of heptanes and 64.8 mole percent of isooctanoic acid, a ratio of 5.35 moles of acid for each mole of hydrocarbon. In order to obtain such product, a period of 5.5 hours was required. Since such reaction time is excessive, it would be desirable to reduce the same. This can be done by the expedient of conducting the reaction in the presence of an oxidation catalyst as shown below in Example II.

EXAMPLE II

This run was carried out in a manner similar to that in Example I except that one gram of an oxidation catalyst, cobalt octasol, which is a 6 percent solution of cobalt octanoate in naphtha, was also present and the reaction time was 3.5 hours. The conversion of the aldehyde was 97.4 percent giving 19.3 mole percent of heptanes and 53.7 mole percent of isooctanoic acid. It will be noted that while the mere presence of a relatively small amount of an oxidation catalyst cut down the reaction time appreciably, from 5.5 hours to 3.5 hours, decarbonylation of aldehyde to hydrocarbon was increased and the ratio of acid to hydrocarbon was merely 2.79. By conducting the process in accordance with my invention, that is, in the presence of both an oxidation catalyst and a soluble salt of a strong base and a weak acid at a moderate temperature, not only is the ratio of acid to hydrocarbon produced high, but the reaction time is substantially less than required in the absence of both an oxidation catalyst and other modifier. This is shown below in Example III.

EXAMPLE III

This run was carried out in a manner similar to that in Example I except that one gram of an oxidation catalyst, cobalt octasol, and one gram of a soluble salt of a strong base and a weak acid, sodium carbonate, were also present and the reaction time was 4.0 hours. The conversion of the aldehyde was 92.3 mole percent, giving 11.4 mole percent of n-heptane and 60.2 mole percent of acid. Comparing the present run with Example I it can be seen that the ratio of acid to hydrocarbon produced is about the same, 5.19 to 5.35, and yet the reaction time has been cut down from 5.5 hours to 4.0 hours, a reduction of about 27 percent. While the reaction time is slightly more in the third run than in the second 4.0 hours to 3.5 hours, this is more than offset by the fact that the ratio of acid to hydrocarbon in the third run is almost twice as great as in the second run, 5.19 to 2.79.

In order to further show the advantages of the present invention, I have made several additional runs as before using 2-ethylhexaldehyde as the aldehyde. The temperature of the reaction in each case was 54° C., the air rate was 0.6 cubic foot per hour, and the reaction time was 2.5 hours. As before, cobalt octanoate and sodium carbonate were used in the amount of one gram each per mole of aldehyde. The results are tabulated below in Table I.

Table 1

| | Example IV | Example V | Example VI | Example VII |
|---|---|---|---|---|
| Catalyst | None | None | Cobalt Octanoate. | Cobalt Octanoate. |
| Modifier | do | $Na_2CO_3$ | None | $Na_2CO_3$. |
| Conversion, Mole Percent. | 34.1 | 38.4 | 68.2 | 63.6. |
| Yields, Mole Percent: | | | | |
| Heptane | 10.4 | 11.3 | 36.6 | 23.9. |
| Acid | 20.8 | 23.3 | 26.0 | 36.2. |
| Acid to Heptane Ratio. | 2.0 | 2.06 | 0.71 | 1.51. |

It is seen from the data in Table I that in order to speed up the reaction and at the same time obtain the desired product distribution (that is, an excess of acid over hydrocarbon), it is absolutely necessary to employ an oxidation catalyst and a soluble salt of a strong base and a weak acid. Thus, employing cobalt octanoate alone as an oxidation catalyst, the conversion of the aldehyde was increased over a given time interval, but the product obtained predominated in hydrocarbons. Using sodium carbonate alone did not disturb the product distribution adversely, but the conversion remained about the same as that obtained in the absence of additives. When both cobalt octanoate and sodium carbonate were used, however, the conversion of aldehyde remained high and the product distribution was excellent.

As charge stock for the reaction any aldehyde, even those of very high molecular weight, can be used. Best results, however, are obtained when the starting aldehyde is an aliphatic aldehyde, straight or branched chain, having a total of about 4 to about 13 carbon atoms in the molecule, preferably straight chain aldehydes and those branched other than in the alpha position. Examples of aldehydes which can be employed are valeraldehyde, isovaleraldehyde, isooctylaldehyde, isodecyl aldehyde, isotridecyl aldehyde, etc. Aldehydes produced in the Oxo process by the reaction of carbon monoxide and hydrogen with an olefin in the presence of a hydroformylation catalyst, as disclosed for example in U. S. Patent No. 2,710,797 to Bernard H. Gwynn, can also be used as charge stock.

The reaction takes place easily with high yields of acids and with minium aldolization side reactions, at a relatively low temperature. While I prefer, for best results, to employ a temperature in the range of about 50° to about 75° C., I can use a temperature as low as about 20° C. or as high as about 100° C. Care, however, must be exercised in the selection of temperature for any particular reaction. Thus, at low temperatures, such as room temperature, rates of reaction will be slow, and at high temperatures, although rates of reaction would increase, side reactions leading to degradation products might occur. The reaction can be carried out at any suitable pressure, and while the rate of reaction may be speeded up by increasing the pressure, the effect upon the yields will be very slight. In general, I can conduct the reaction at a pressure of about 15 to about 150, preferably about 15 to about 30, pounds per square inch absolute.

Although the rate of feed of gas containing molecular oxygen has little or no effect on the yields of hydrocarbons, higher rates of addition of oxygen to the reaction mixture will have a tendency to bring about higher reaction rates. An upper limit is determined by the rate at which the heat of reaction can be removed from the reactor to maintain the desired temperature. Generally, I can employ the gas containing molecular oxygen, based upon the molecular oxygen, at a rate of about 0.03 to about 0.50, preferably about 0.1 to about 0.3, cubic foot of molecular oxygen per mole of aldehyde per hour. The rate of the reaction will be determined to a large extent by the starting aldehyde employed, the pressure and temperature utilized, the rate of feed of oxygen, and the use of an oxidation catalyst and a soluble salt of a strong base and a weak acid.

As noted, the present process must be conducted in the presence of a strong oxidation catalyst, particularly oil soluble organic salts of the transition elements and their corresponding organic oxides, and a salt of a strong base and a weak acid. As examples of oxidation catalysts, oil soluble organic salts whose cation component can be cobalt, nickel, iron, chromium, iridium, rhodium, copper, silver, manganese and vanadium and whose anion component can be represented by $RCO_2-$ wherein R is an open chain aliphatic radical having about 7 to about 17 carbon atoms or a cycloaliphatic radical can be employed as well as the corresponding oxides. Oxidation catalysts which have been found to be particularly suitable for the reaction are the cobalt salt of 2-ethylhexanoic acid and manganese naphthenate. Any salt of a strong base and a weak acid can be employed, examples of which are sodium acetate, potassium carbonate, rubidium propionate and cesium phosphate. In general I can use about 0.1 to about 5.0 grams, preferably about 0.5 to about 2.0 grams of the salt per gram mole of aldehyde.

The concentration of catalyst needed for the reaction is small, and, in fact, traces of catalyst would be sufficient in view of the fact that the reaction is believed to be a chain-type reaction. In general I can use about 0.003 to about 0.5, preferably about 0.006 to about 0.1, gram of oxidation catalyst per gram mole of aldehyde.

Obviously, many modifications and variations of the invention, as hereinabove set forth, may be made without departing from the spirit and scope thereof, and thereof only such limitations should be imposed as are indicated in the appended claims.

I claim:

1. A process of converting an aldehyde having as its only functional group the aldehyde group to a product comprising the corresponding acid which comprises subjecting an aliphatic aldehyde to the action of a gas containing molecular oxygen in the presence of an oxidation catalyst selected from the group consisting of oil soluble organic salts of the transition elements and their corresponding organic oxides and a salt of a strong base and a weak acid at a moderate temperature of about 20° to about 100° C.

2. A process of converting an aldehyde having as its only functional group the aldehyde group to a product comprising the corresponding acid which comprises subjecting an aliphatic aldehyde to the action of a gas containing molecular oxygen at a rate corresponding to about 0.03 to about 0.5 cubic foot of oxygen per mole of aldehyde per hour, through a composition comprising an aldehyde in the presence of an oxidation catalyst selected from the group consisting of oil soluble organic salts of the transition elements and their corresponding organic oxides and a salt of a strong base and a weak acid at a moderate temperature of about 20° to about 100° C.

3. A process of converting an aldehyde to a product comprising the corresponding acid which comprises passing a gas containing molecular oxygen at a rate corresponding to about 0.03 to about 0.5 cubic foot of oxygen per mole of aldehyde per hour, through a composition comprising 2-ethylhexaldehyde in the presence of an oxidation catalyst selected from the group consisting of oil soluble organic salts of the transition elements and their corresponding organic oxides and a salt of a strong base and a weak acid at a moderate temperature of about 20° to about 100° C.

4. A process of converting an aldehyde to a product comprising the corresponding acid which comprises passing a gas containing molecular oxygen at a rate corresponding to about 0.03 to about 0.5 cubic foot of oxygen per mole of aldehyde per hour, through a composition comprising an aldehyde having a total of 8 carbon atoms obtained in the Oxo process, in the presence of an oxidation catalyst selected from the group consisting of oil soluble organic salts of the transition elements and their corresponding organic oxides and a salt of a strong base and a weak acid at a moderate temperature of about 20° to about 100° C.

5. A process of converting an aldehyde to a product comprising the corresponding acid which comprises passing a gas containing molecular oxygen at a rate corresponding to about 0.03 to about 0.5 cubic foot of oxygen per mole of aldehyde per hour, through a composition comprising 2-ethylhexaldehyde in the presence of the cobalt salt of 2-ethylhexanoic acid and a salt of a strong base and a weak acid at a temperature of about 50° to about 75° C.

6. A process of converting an aldehyde to a product comprising the corresponding acid which comprises passing a gas containing molecular oxygen at a rate corresponding to about 0.03 to about 0.5 cubic foot of oxygen per mole of aldehyde per hour, through a composition comprising an aldehyde having a total of 8 carbon atoms obtained in the Oxo process, in the presence of the cobalt salt of 2-ethylhexanoic acid and a salt of a strong base and a weak acid at a temperature of about 50° to about 75° C.

7. A process of converting an aldehyde to a product comprising the corresponding acid which comprises passing a gas containing molecular oxygen at a rate corresponding to about 0.03 to about 0.5 cubic foot of oxygen per mole of aldehyde per hour, through a composition comprising 2-ethylhexaldehyde in the presence of an oxidation catalyst selected from the group consisting of oil soluble organic salts of the transition elements and their corresponding organic oxides and sodium carbonate at a temperature of about 50° to about 75° C.

8. A process of converting an aldehyde to a product comprising the corresponding acid which comprises passing a gas containing molecular oxygen at a rate corresponding to about 0.03 to about 0.5 cubic foot of oxygen per mole of aldhyde per hour, through a composition comprising an aldehyde having a total of 8 carbon atoms obtained in the Oxo process, in the presence of an oxidation catalyst selected from the group consisting of oil soluble organic salts of the transition elements and their corresponding organic oxides and sodium carbonate at a temperature of about 50° to about 75° C.

9. A process of converting an aldehyde to a product comprising the corresponding acid which comprises passing a gas containing molecular oxygen at a rate corresponding to about 0.03 to about 0.5 cubic foot of oxygen per mole of aldehyde per hour through a composition comprising 2-ethylhexaldehyde in the presence of the cobalt salt of 2-ethylhexanoic acid and sodium carbonate at a temperature of about 50° to about 75° C.

10. A process of converting an aldehyde to a product comprising the corresponding acid which comprises passing a gas containing molecular oxygen at a rate corresponding to about 0.03 to about 0.5 cubic foot of oxygen per mole of aldehyde per hour through a composition comprising an aldehyde having a total of 8 carbon atoms obtained in the Oxo process, in the presence of the cobalt salt of 2-ethylhexanoic acid and sodium carbonate at a temperature of about 50° to about 75° C.

References Cited in the file of this patent

UNITED STATES PATENTS 2,223,493   Loder _____ Dec. 3, 1940

FOREIGN PATENTS 106,914   Australia _____ Mar. 13, 1939

OTHER REFERENCES

Perry Abs. of Serial No. 121,229, 652 O. G. 892, 11–20–50 (1 page).